United States Patent [19]

Saito

[11] Patent Number: 5,257,386
[45] Date of Patent: Oct. 26, 1993

[54] DATA TRANSFER CONTROL SYSTEM FOR VIRTUAL MACHINE SYSTEM

[75] Inventor: Masaru Saito, Yokohama, Japan

[73] Assignee: Fujitsu Limited, Kanagawa, Japan

[21] Appl. No.: 679,853

[22] Filed: Apr. 3, 1991

[30] Foreign Application Priority Data

Apr. 5, 1990 [JP] Japan .................................. 2-90590

[51] Int. Cl.⁵ .............................................. G06F 9/30
[52] U.S. Cl. .................................... 395/775; 395/425;
395/375; 364/DIG. 1; 364/DIG. 2
[58] Field of Search ........................ 395/375, 775, 425;
364/200, 900

[56] References Cited

U.S. PATENT DOCUMENTS 4,821,172 4/1989 Kaneko et al. ...................... 395/375

Primary Examiner—Dale M. Shaw
Assistant Examiner—Moustafa M. Meky
Attorney, Agent, or Firm—Nikaido, Marmelstein, Murray & Oram

[57] ABSTRACT

A virtual machine system includes a storage for storing at least transfer priorities of virtual machines, a queuing part for making a queue of data transfer requests which request data transfers between a main storage and an external storage and are received from operating systems which operate on each of the virtual machines, a limiting part for limiting a transfer data length of one data transfer which is requested by each data transfer request in the queue of the queuing part depending on the transfer priority of the virtual machine from which the data transfer request is received, so that a data transfer is made in divisions if the requested transfer data length exceeds a length limit determined by the transfer priority, a generating part for generating a first data transfer request in place of each operating system with the transfer data length determined by the limiting part so as to start a first data transfer between the main and external storages, and a calculating part for calculating a data length of a remaining transfer data which remains to be transferred when the first data transfer is completed and for automatically generating a second data transfer request requesting transfer of the remaining transfer data. The second data transfer request is inserted in the queue of the queuing part so that the remaining transfer data is transferred between the main and external storages in one or a plurality of second data transfers.

18 Claims, 8 Drawing Sheets

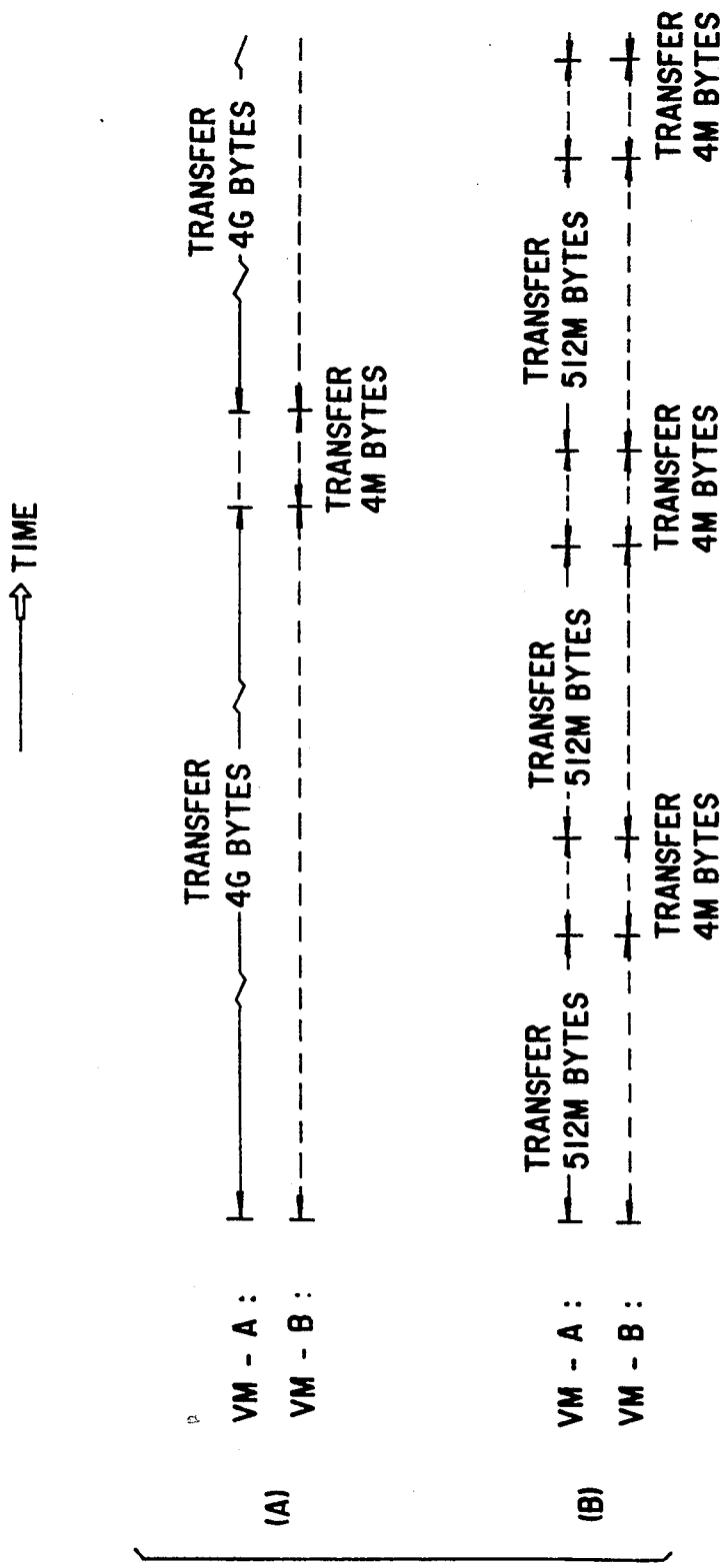

DATA TRANSFER CONTROL SYSTEM FOR VIRTUAL MACHINE SYSTEM

BACKGROUND OF THE INVENTION

The present invention generally relates to data control systems, and more particularly to a data control system for a virtual machine system.

In order to meet the demands to increase the scale and speed of computer systems, there are proposals to realize a high-speed large-quantity data transfer within the system and between the systems using an external storage. There are similar demands on the virtual machine system. Hence, there are proposals to assign an external storage for each virtual machine so as to realize a data transfer within the virtual machine and between the virtual machines using the external storage.

However, when the data transfer quantity is large, the data transfer process may be concentrate on a specific virtual machine and cause problems.

In a native environment other than the virtual machine system, a number of paths between the external storage and the main storage generally does not become smaller than the number of systems. For this reason, a path used for the data transfer between the main storage and the external storage in one system will not be used by another system, and a transfer request will not have to wait. In other words, a situation where the transfer request must wait because the path used for the data transfer between the main storage and the external storage of the system is being used by another system will not occur.

However, in the virtual machine system, the number of paths between the main storage and the external storage may be smaller than the number of virtual systems. Consequently, when a virtual machine transfers a large quantity of data to the external storage, this virtual machine exclusively uses the path between the main storage and the external storage for a long time. As a result, the transfer requests of other virtual machines which cannot use the path must wait until the path becomes free, and the actual data transfers are greatly delayed.

Accordingly, when an operating system which operates on the virtual machine carries out a data transfer between the main storage and the external storage during a process such as a paging process which affects the entire performance of the operating system, the performance of the operating system is greatly affected and there is a problem in that the performance greatly differs for each virtual machine.

SUMMARY OF THE INVENTION

Accordingly, it is a general object of the present invention to provide a novel and useful data transfer control system in which the problem described above is eliminated.

Another and more specific object of the present invention is to provide a data transfer control system for a virtual machine system which includes a plurality of virtual machines, a main storage and an external storage which is accessible by each of the virtual machines, comprising storage means for storing at least transfer priorities of each of virtual machines, queuing means for making a queue of data transfer requests which request data transfers between the main storage and the external storage and are received from operating systems which operate on each of the virtual machines, limiting means coupled to the storage means and the queuing means for limiting a transfer data length of one data transfer which is requested by each data transfer request in the queue of the queuing means depending on the transfer priority of the virtual machine from which the data transfer request is received, so that a data transfer is made in divisions if the requested transfer data length exceeds a length limit determined by the transfer priority, generating means coupled to the limiting means for generating a first data transfer request in place of each operating system with the transfer data length determined by the limiting means so as to start a first data transfer between the main storage and the external storage, and calculating means coupled to the generating means for calculating a data length of a remaining transfer data which remains to be transferred when the first data transfer is completed and for automatically generating a second data transfer request requesting transfer of the remaining transfer data, the second data transfer request being inserted in the queue of the queuing means so that the remaining transfer data is transferred between the main storage and the external storage in one or a plurality of second data transfers. According to the data transfer control system of the present invention, it is possible to control the data transfer quantity of one data transfer for each virtual machine. For this reason, it is possible to provide balanced services of the virtual machine without great differences in the performances of the virtual machines.

Still another object of the present invention is to provide a data transfer control system for a virtual machine system which includes a plurality of virtual machines, a main storage and an external storage which is accessible by each of the virtual machines, comprising storage means for storing at least transfer priorities of each of virtual machines, queuing means for making a queue of data transfer requests which request data transfers between the main storage and the external storage and are received from operating systems which operate on each of the virtual machines, limiting means coupled to the storage means and the queuing means for limiting a transfer data length of one data transfer which is requested by each data transfer request in the queue of the queuing means depending on the transfer priority of the virtual machine from which the data transfer request is received, so that a data transfer is made in divisions if the requested transfer data length exceeds a length limit determined by the transfer priority, generating means coupled to the limiting means for generating a first data transfer request in place of each operating system with the transfer data length determined by the limiting means so as to start a data transfer between the main storage and the external storage, and calculating means coupled to the generating means for calculating a data length of a remaining transfer data which remains to be transferred when the data transfer is completed and for notifying the operating system of the data length of the remaining transfer data so that the operating system generates a data transfer request for the remaining transfer data. According to the data transfer control system of the present invention, it is possible to control the data transfer quantity of one data transfer for each virtual machine. For this reason, it is possible to provide balanced services of the virtual machine without great differences in the performances of the virtual machines.

Other objects and further features of the present invention will be apparent from the following detailed description when read in conjunction with the accompanying drawings.

BRIEF DESCRIPTION OF THE DRAWINGS

FIG.9 is a time chart for comparing the effects of the present invention and the conventional system.

DESCRIPTION OF THE PREFERRED EMBODIMENTS

Figure 1:
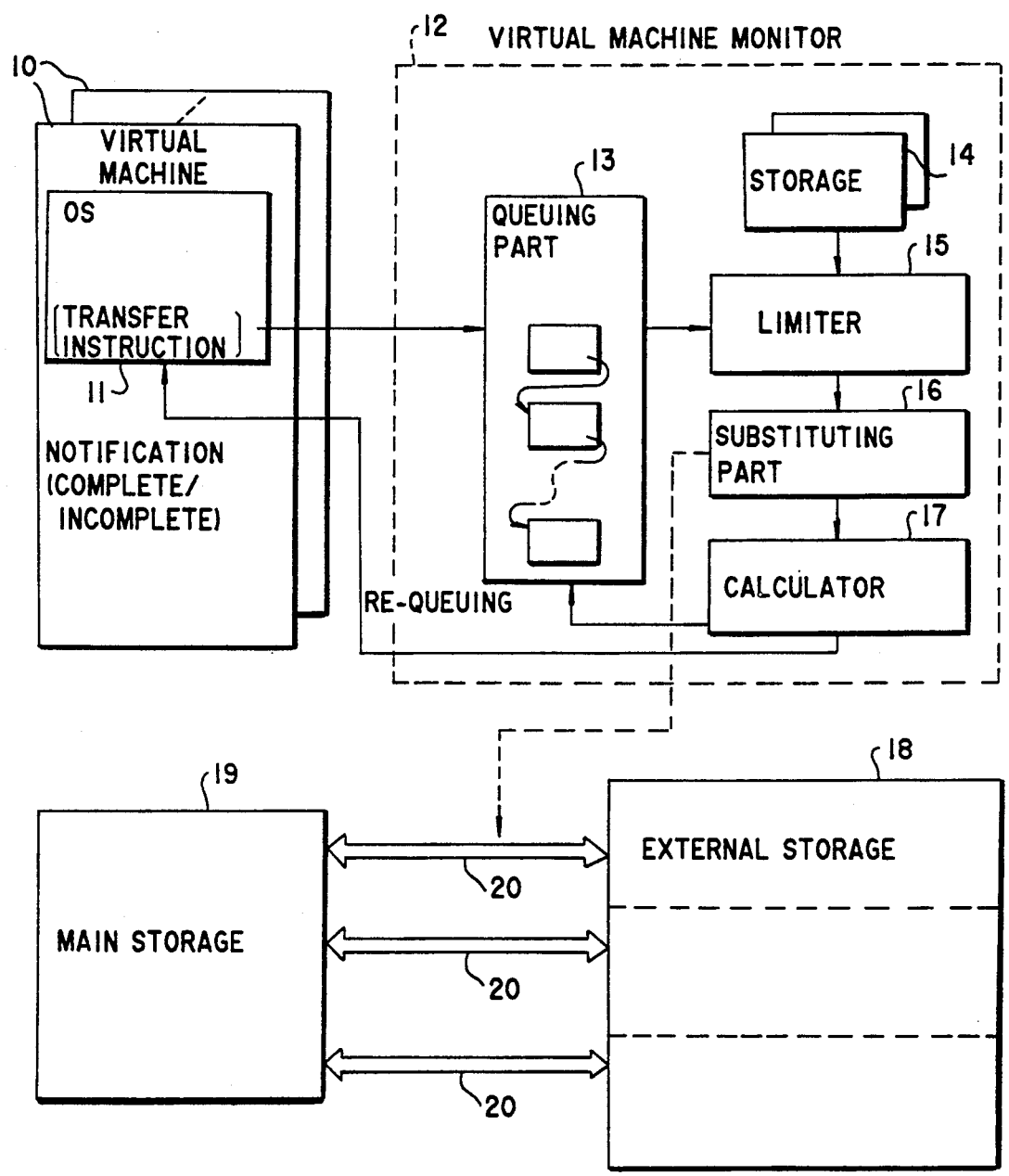
FIG.1 is a system block diagram for explaining an operating principle of a data transfer control system according to the present invention.

First, a description will be given of an operating principle of a data transfer control system of the present invention, by referring to FIG.1. The data transfer control system includes a plurality of virtual, machines 10, an operating system (OS) 11 which operates on each virtual machine 10, a virtual machine monitor 12 which controls the virtual machines 10, an external storage 18, a main storage 19 and paths 20. The virtual machine monitor 12 includes a transfer request queuing part 13, a transfer priority storage 14, a transfer length limiter 15, a transfer instruction substituting part 16 and a transfer remainder length calculator 17.

For example, the external storage 18 is formed by a semiconductor memory device having a high access speed, and the external storage 18 is provided independently of the main storage 19. The access to the external storage 18 is made by an asynchronous transfer instruction of the operating system (a central processing unit (CPU)), and not by an input/output instruction.

The paths 20 form data transfer paths between the external storage 18 and the main storage 19 for transferring data in parallel. When there are three paths 20, for example, it is possible to make three data transfers simultaneously at the maximum.

In the present invention, it is possible to register the transfer priority of each virtual machine 10 before registering the configuration definition information of each virtual machine 10 into the system. The transfer priority storage 14 stores the transfer priority of each virtual machine 10.

When the operating system 11 which operates on the virtual machine 10 issues an asynchronous transfer instruction which instructs a data transfer between the external storage 18 and the main storage 19, the virtual machine monitor 12 intercepts this asynchronous transfer instruction and starts the transfer request queuing part 13.

The transfer request queuing part 13 carries out a process to insert a request related to the above asynchronous transfer instruction to an internal queue.

The actual data transfer process is carried out by taking out the requests from the queue one request at a time. With respect to the request which is taken out from the queue, the transfer length limiter 15 limits the transfer data length of one transfer depending on the transfer priority of the virtual machine 10 which is the source of the request, where the transfer priority is stored in the transfer priority storage 14. In other words, when the requested transfer data length is longer than the limit of the transfer data length which is dependent on the transfer priority, the requested transfer data length is divided, that is, shortened, so that the transfer data length falls within the limit.

The numerical value of the limit of the transfer data length may be stored directly into the transfer priority storage 14 for each virtual machine 10.

The transfer instruction substituting part 16 issues an asynchronous transfer instruction with the limited or shortened transfer data length in place of the operating system 11 of the virtual machine 10. Accordingly, the data transfer between the main storage 19 and the external storage is started.

When the data transfer is completed, the transfer remainder length calculator 17 calculates the remaining transfer data length which is not yet transferred out of the requested transfer data length, and judges whether or not the request from the operating system 11 is satisfied.

When the request from the operating system 11 is not satisfied, a transfer request for the remaining transfer data length which needs to be transferred is inserted into the queue which is managed by the transfer request queuing part 13 within the virtual machine monitor 12. That is, the transfer remainder length calculator 17 makes reinserts the transfer request into the queue of the transfer request queuing part 13.

Alternatively, the transfer remainder length calculator 17 notifies the remaining transfer data length which needs to be transferred to the operating system 11 of the virtual machine 10 which is the source of the request. In this case, the operating system 11 re-requests the data transfer of the remaining transfer data length which is not yet transferred by an asynchronous transfer instruction based on the information notified from the transfer remainder length calculator 17.

On the other hand, when the request from the operating system 11 is satisfied, the transfer remainder length calculator 17 notifies the completion of the transfer to the operating system 11.

According to the present invention, the transfer data length of the transfer request using the path 20 between the main storage 19 and the external storage 18 is divided into transfer data lengths appropriate for the transfer priority which is defined with respect to each virtual machine 10. In addition, the virtual machine monitor 12 controls the data transfer process of each virtual machine 10 so that the transfer requests of other virtual machines 10 can interrupt the data transfer process of one virtual machine 10.

For this reason, it is possible to prevent one virtual machine 10 from exclusively using the path 20 between the main storage 19 and the external storage 18 for a long time. Consequently, even when the operating system 11 which operates on the virtual machine 10 carries out a data transfer between the main storage 19 and the external storage 18 during a process such as a paging process which affects the entire performance of the operating system 11, the performance related to the data transfer will not greatly differ among the virtual machines 10.

For example, the following instructions of the operating system (CPU instructions) are provided with respect to the external storage 18 from the operating system.

Instruction (a): An instruction which instructs a data transfer of a specified length (for example, a maximum of 4 Gbytes) from the main storage 19 to the external storage 18 by specifying virtual addresses of the main and external storages 19 and 18.

Instruction (b): An instruction which instructs a data transfer of a specified length (for example, a maximum of 4 Gbytes) from the external storage 18 to the main storage 19 by specifying virtual addresses of the external and main storages 18 and 19.

Instruction (c): An instruction which instructs a data transfer of a specified length (for example, 4 kbytes * entries) from the main storage 19 to the external storage 18 by specifying real addresses of the main and external storages 19 and 18.

Instruction (d): An instruction which instructs a data transfer of a specified length (for example, 4 kbytes * entries) from the external storage 18 to the main storage 19 by specifying real addresses of the external and main storages 18 and 19.

Instruction (e): An instruction requesting the length of actually transferred data.

The instructions (a) through (d) are asynchronous instructions which do not require the operating system (CPU) to wait for the request to be completed, while the instruction (e) is a synchronous instruction which requires the operating system (CPU) to wait for the request to be completed. In the case of the instructions (a) through (d), the completion of the data transfer is notified to the source which issued the instruction by an external interrupt. Hence, the instruction (e) requests the length of the actually transferred data after one of the instructions (a) through (d) is issued and the external interrupt indicating the completion of the data transfer is received.

Figure 2:
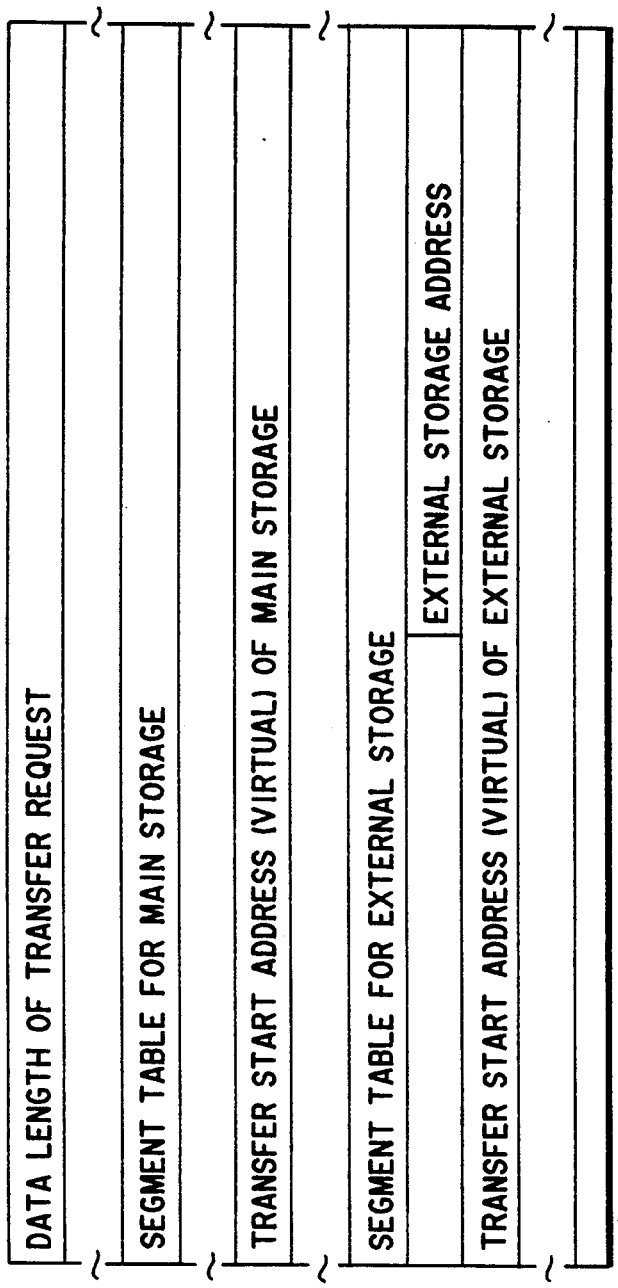
FIGS.2 and 3 respectively are diagrams showing embodiments of instruction formats.
Figure 3:
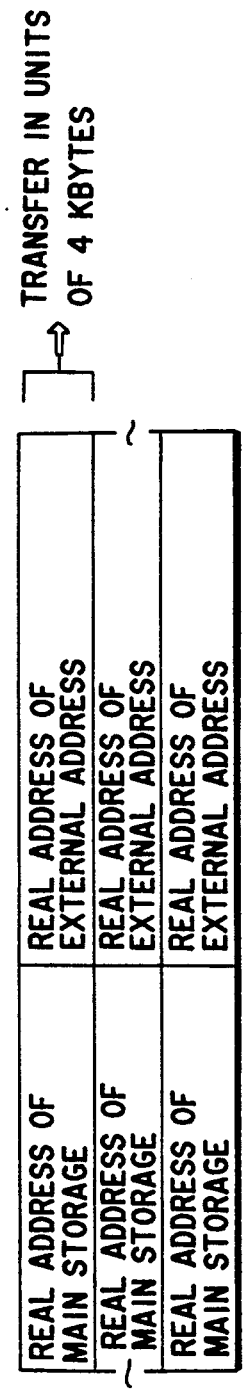

FIG.2 shows an embodiment of a format of the instructions (a) and (b), and FIG.3 shows an embodiment of the instructions (c) and (d).

Figure 4:
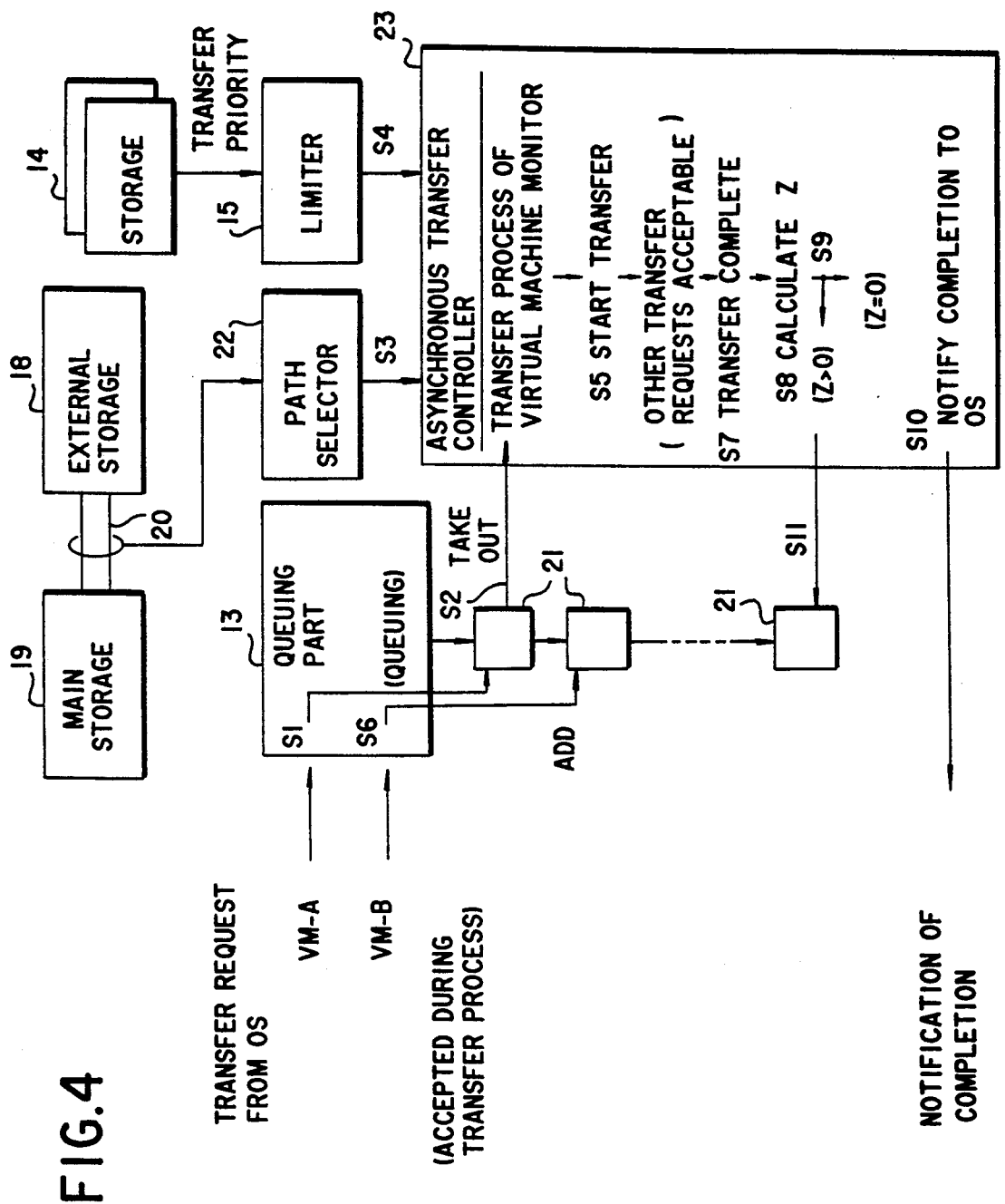
FIG.4 is a system block diagram showing a first embodiment of the data transfer control system according to the present invention.
Figure 5:
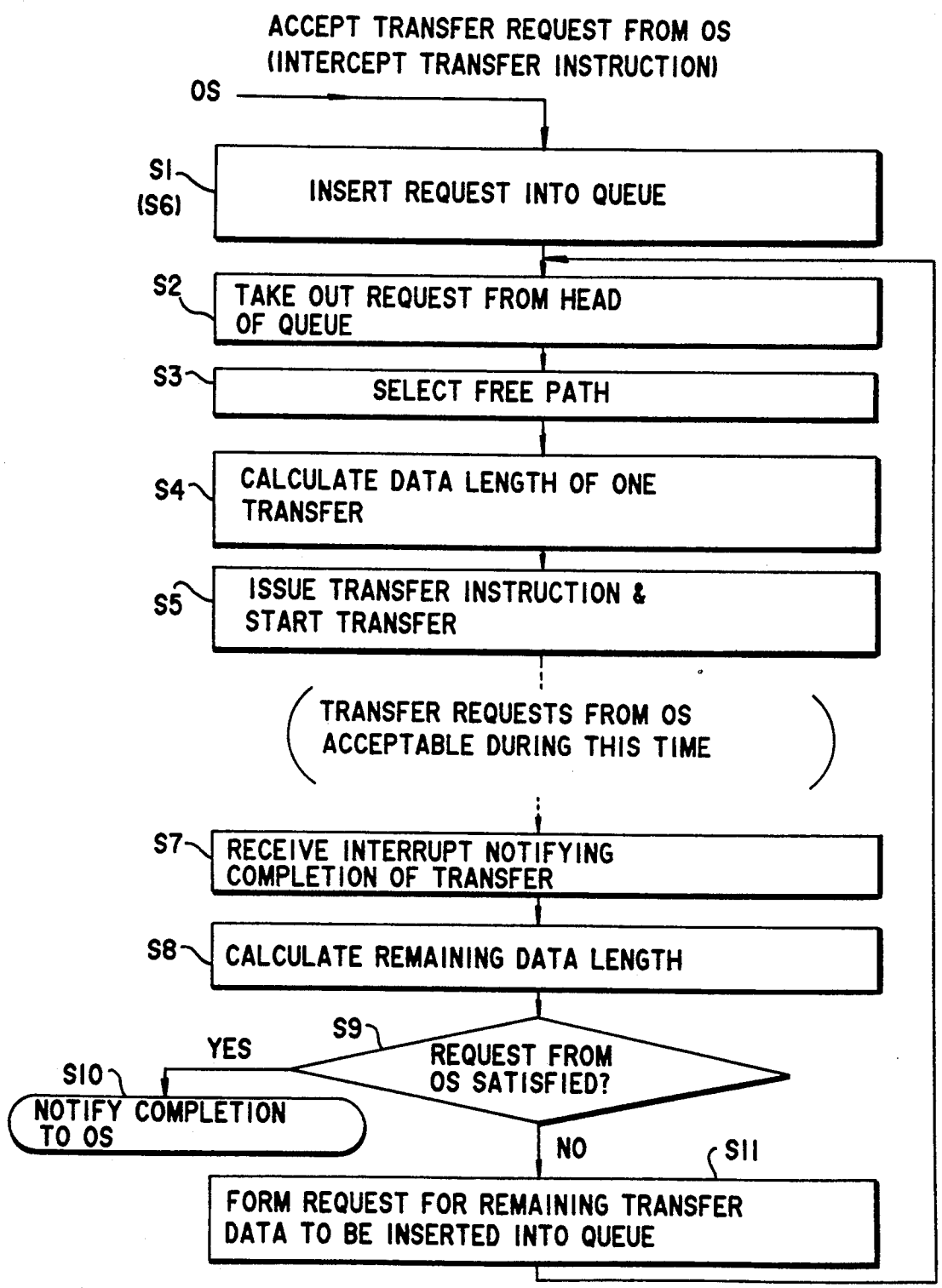
FIG.5 is a flow chart for explaining an operation of the first embodiment.

Next, a description will be given of a first embodiment of the data transfer control system according to the present invention, by referring to FIGS.4 and 5. FIG.4 is a system block diagram showing the first embodiment, and FIG.5 is a flow chart for explaining an operation of the first embodiment. In FIG.4, those parts which are the same as those corresponding parts in FIG.1 are designated by the same reference numerals. In addition, in the following description, S1 through S11 respectively correspond to the steps S1 through S11 appearing in FIGS.4 and 5.

Step S1: When the operating system which operates on the virtual machine issues an asynchronous transfer instruction (a) and requests a data transfer between the main storage 19 and the external storage 18, the asynchronous transfer instruction is intercepted and the request is inserted into the queue of the transfer request queuing part 13. Information related to a transfer source address, a transfer destination address, a transfer data length and the like is stored in a request data block 21 which describes this request.

Figure 6:
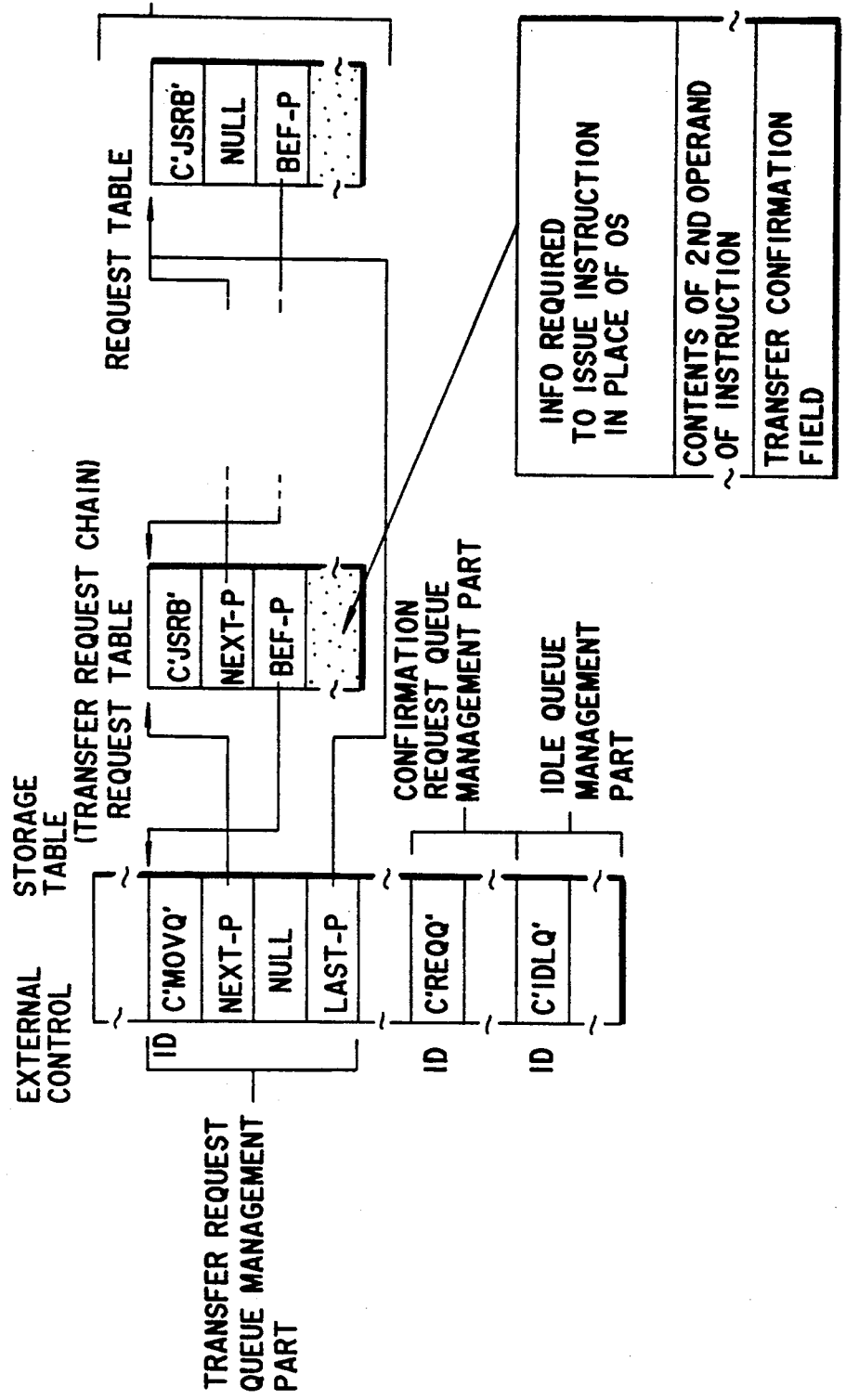
FIG.6 is a diagram for explaining the operation of the transfer request queuing part.

FIG.6 is a diagram for explaining the operation of the transfer request queuing part 13. As shown in FIG.6, the transfer request queuing part 13 includes an external storage control table and a transfer request chain. The external storage control table includes a transfer request queue management part, a confirmation request queue management part, and an idle queue management part. The confirmation request queue management part manages the confirmation request queue which requests confirmation of the length of the transfer request from the operating system. On the other hand, the transfer request chain is made up of a chain of request tables.

The request table includes information required to issue an instruction in place of the operating system, contents of a second operand of the instruction, and a transfer confirmation field for confirming transfer. The information required to issue the instruction in place of the operating system includes identification information for identifying the virtual machine, identification information for identifying the operating system of the virtual machine 10 (virtual CPU), identification information for identifying the kind of instruction and the like. The contents of the second operand of the instruction includes the transfer data length, the transfer source address, the transfer destination address and the like. The transfer confirmation field includes the remaining transfer data length and the like.

The transfer request queuing part 13 inserts the request of the asynchronous transfer instruction (a) into the queue by finding a request data block 21 which corresponds to the request from the idle queue (C'IDLQ') and inserting the request data block 21 which is found into the transfer request chain. In addition, the contents of the second operand of the instruction which is issued from the operating system, the kind of instruction, the identifier of the virtual machine which issued the instruction and the like are stored within the request data block 21.

Step S2: The requests in queue are successively taken out by an asynchronous transfer controller 23.

Step S3: A path selector 22 selects a free path 20 between the main storage 19 and the external storage 18 for the request. In other words, when a plurality of paths 20 is usable by the address of the external storage 18, the path selector 22 judges whether or not the path 20 is free for each of the paths 20 to assign a free path 20 for the request.

Step S4: The transfer length controller 15 refers to the transfer priority storage 14 and calculates the transfer data length of one data transfer depending on the transfer priority for each virtual machine.

Step S5: The asynchronous transfer controller 23 issues an asynchronous transfer instruction (a) in place of the operating system of the virtual machine from which the request originates, so as to start the data transfer. That kind of instruction is stored within the request data block 21, and thus, that kind of instruction can be judged from the request data block 21. During this data transfer, it is possible to accept other transfer requests from the operating system by the transfer request queuing part 13.

Step S6: Until the data transfer requested by the operating system of a virtual machine VM-A is completed, the transfer request queuing part 13 can insert a transfer request from the operating system which operates on a virtual machine VM-B into the queue if such a transfer request exists.

Step S7: The asynchronous transfer controller 23 is notified of the completion of the data transfer by an interrupt.

Step S8: When the data transfer is completed, the asynchronous transfer controller 23 compares the requested transfer data length and the transfer data length which is substituted by the virtual machine monitor, and calculates the remaining transfer data length z which is yet to be transferred. The asynchronous transfer controller 23 issues the synchronous instruction (e) and obtains the data length which is actually transferred, and the obtained data length or the remaining transfer data length is stored in the transfer confirmation field of the request table.

Step S9: The asynchronous transfer controller 23 judges whether or not the transfer data length requested by the operating system is satisfied based on whether or not the remaining transfer data length z is zero.

Step S10: When all the data transfer requested from the operating system is ended as a result of the judgement in the step S9, the asynchronous transfer controller 23 notifies the completion of the data transfer to the operating system.

Step S11: On the other hand, when the remaining transfer data length z is not zero, the asynchronous transfer controller 23 forms a request for the data having the remaining transfer data length z, and inserts the request at the end of the queue which is managed by the transfer request queuing part 13. The above described process is repeated within the virtual machine monitor until the request from the operating system is satisfied.

Figure 7:
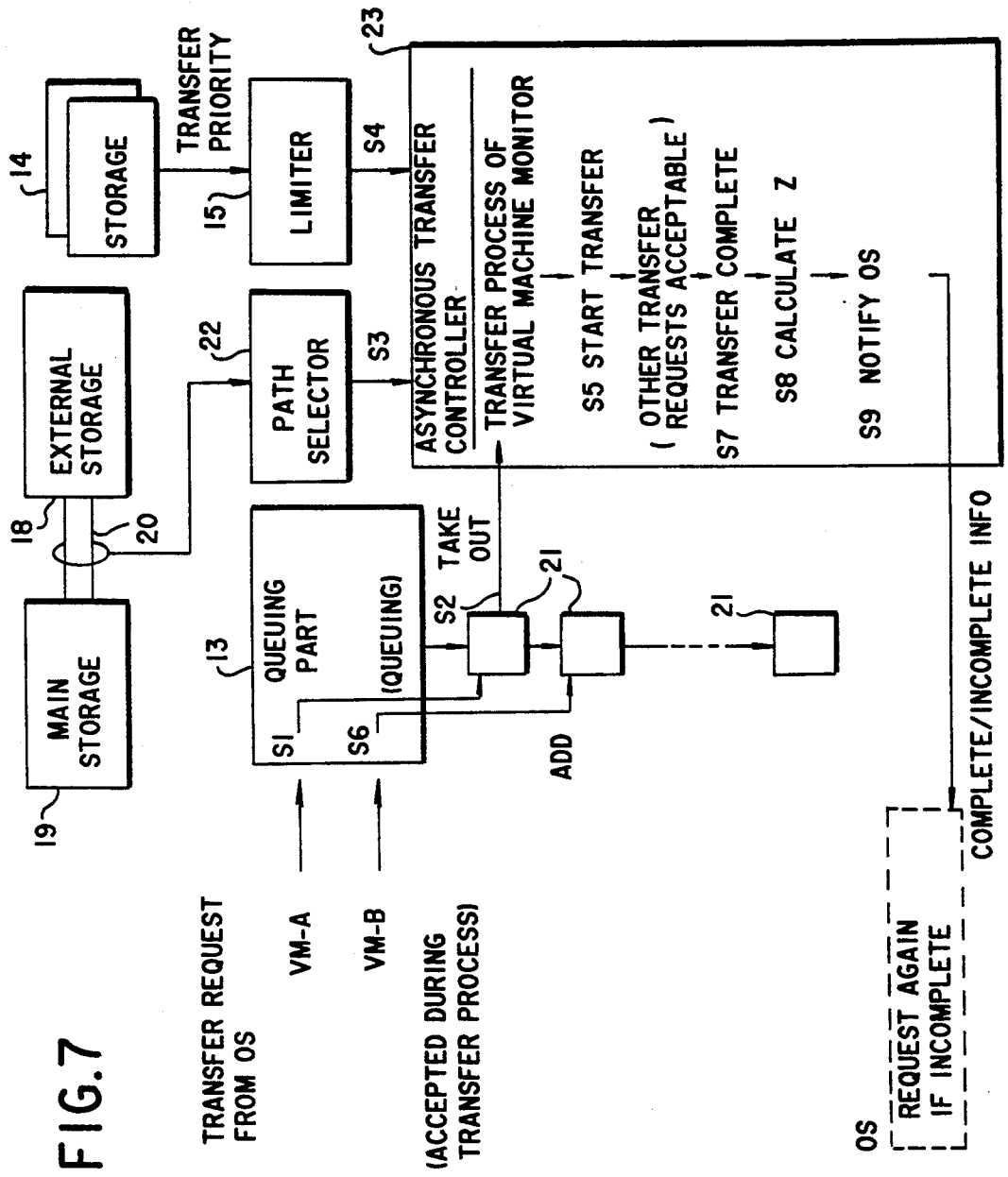
FIG.7 is a system block diagram showing a second embodiment of the data transfer control system according to the present invention.
Figure 8:
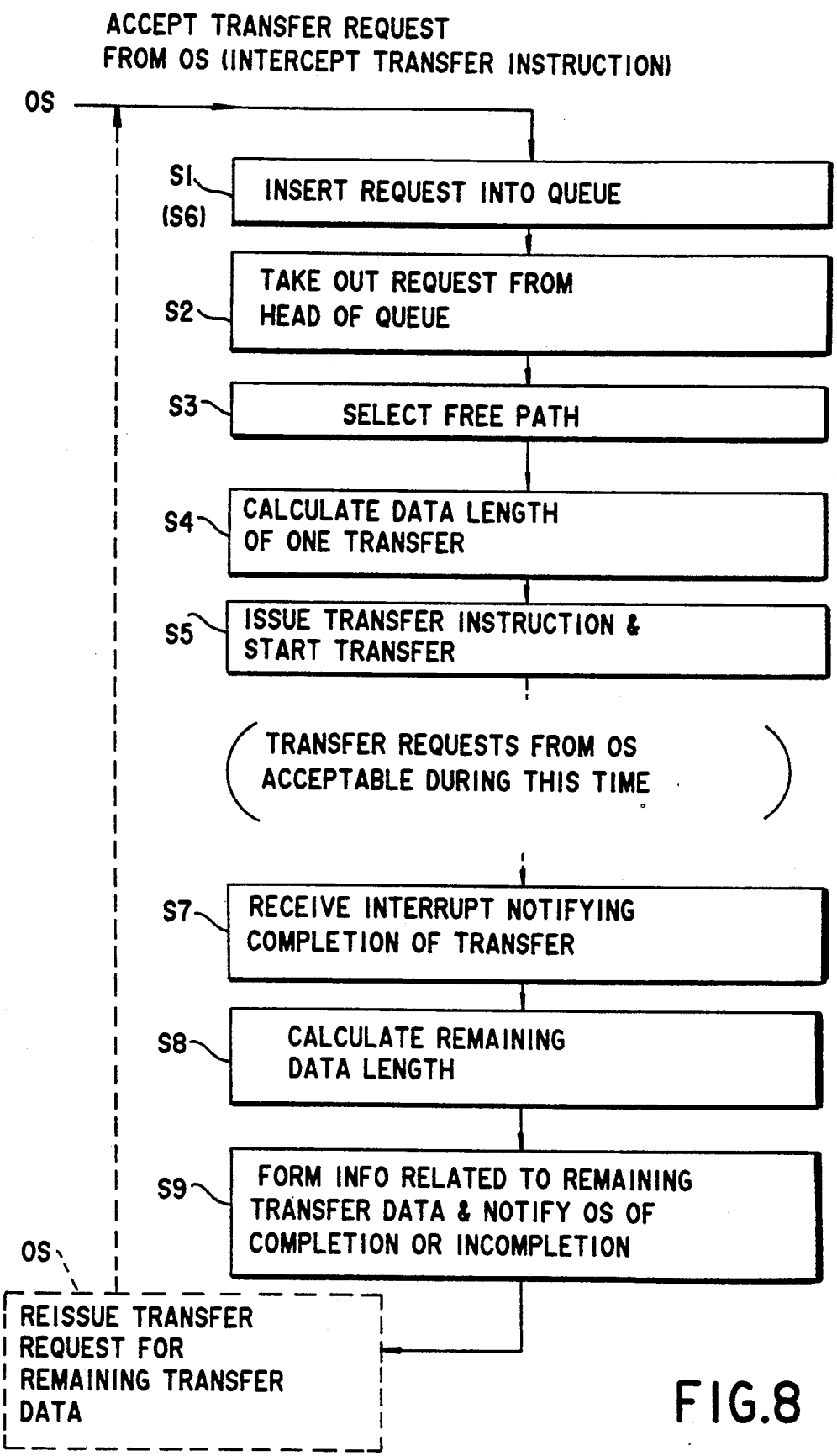
FIG.8 is a flow chart for explaining an operation of the second embodiment.

Next, a description will be given of a second embodiment of the data transfer control system according to the present invention, by referring to FIGS.7 and 8. FIG.7 is a system block diagram showing the second embodiment, and FIG.8 is a flow chart for explaining an operation of the first embodiment. In FIG.7, those parts which are the same as those corresponding parts in FIGS.1 and 4 are designated by the same reference numerals, and a description thereof will be omitted. In addition, in FIG.8, those steps which are the same as those corresponding steps in FIG.5 are designated by the same reference numerals, and a description thereof will be omitted.

In the first embodiment, when the request from the operating system is not satisfied by one data transfer, the request is automatically inserted into the queue again and the completion of the data transfer is notified to the operating system after all data transfers are completed. On the other hand in this second embodiment, when the request from the operating system is not satisfied by one data transfer, the virtual machine monitor 12 notifies the operating system of information indicating that the request from the operating system was not satisfied and information related to the remaining data which was not transferred, using hardware specifications or handshaking with the operating system.

For example, the virtual machine monitor 12 carries out the following. That is, the completion of the data transfer is notified to the operating system which is the source of the request by an external interrupt. The request block 21 shown in FIG.6 is inserted into the confirmation request queue. The issuance of the synchronous instruction (e) from the operating system is waited, and the instruction (e) is intercepted when issued from the operating system. The contents of the transfer confirmation field of the corresponding request data block 21 in the confirmation request queue shown in FIG.6 are stored in the second operand of the instruction (e) which is received from the operating system, and the request data block 21 is inserted into the idle queue. In other words, the data length which is shorter that the requested data length is notified to the operating system when the requested data length is not transferred in one data transfer.

Based on this information from the virtual machine monitor 12, the operating system makes a data transfer request again for the remaining data which was not transferred.

That is, the operating system carries out the following. The data length which is actually transferred by the previous data transfer is added to the immediately preceding request addresses (both the transfer source address and the transfer destination address), and the data length which is actually transferred by the previous data transfer is subtracted from the previous requested transfer data length, to reissue the instruction (a).

The operating system is notified of the completion of the data transfer when all data transfers finally end.

In FIGS.7 and 8, the steps S1 through S8 are identical to the steps S1 through S8 shown in FIGS.4 and 5.

In this second embodiment, a step S9 forms information related to the remaining transfer data length z in the asynchronous transfer controller 23, and notifies the operating system of the completion of the data transfer or the incomplete data transfer depending on whether or not the remaining transfer data length z is zero. In the case of the incomplete data transfer, the operating system forms a request for the data transfer to transfer the remaining data and reissues a transfer instruction.

For example, it is assumed for the sake of convenience that the virtual machine VM-A continuously makes transfer requests of 4 Gbytes each between the main storage 19 and the external storage 18, and the virtual machine VM-B continuously makes transfer requests of 4 Mbytes each.

In this case, the time chart for the conventional system becomes as shown in FIG.9(A), where the solid line indicates the duration of the data transfer and the dotted line indicates a waiting time for which the data transfer must wait because the same path 20 is used.

In the conventional system, the virtual machine monitor substitutes for the transfer requests from the virtual machines VM-A and VM-B as they are. For this reason, the 4 Mbyte data transfer request of the virtual machine VM-B is executed after the 4 Gbyte data transfer requested from the virtual machine VM-A ends, and such a process is alternately repeated. Hence, particularly when the virtual machine VM-B is carrying out a process such as a data base process and a paging process which require execution at a high speed, the waiting time for the data transfer is long and the deterioration of performance caused thereby is large.

On the other hand, according to the present invention, the virtual machine monitor substitutes for the transfer instruction by dividing the 4 Gbyte data transfer request into 512 Mbyte transfer requests, for example, depending on the transfer priority which is predefined with respect to the virtual machine VM-A.

Accordingly, as shown in FIG.9(B), the waiting time of the virtual machine VM-B with respect to each 4 Mbyte data transfer request is only the data transfer time of 512 Mbytes. Therefore, it can be seen that the waiting time is considerably shortened.

The embodiments described above are described using the asynchronous instruction (a) as an example, but the basic operation of the embodiments are the same for the asynchronous instructions (b), (c) and (d).

Further, the present invention is not limited to these embodiments, but various variations and modifications may be made without departing from the scope of the present invention.

What is claimed is:

1. A data transfer control system for a virtual machine system which includes a plurality of virtual machines, a main storage and an external storage which is accessible by each of the virtual machines, said data transfer control system comprising:

storage means for storing at least transfer priorities of each of the virtual machines;

queuing means for making a queue of data transfer requests which request data transfers between the main storage and the external storage and are received from operating systems which operate on each of the virtual machines;

limiting means coupled to said storage means and said queuing means for limiting a transfer data length of one data transfer which is requested by each data transfer request in the queue of said queuing means depending on the transfer priority of the virtual machine from which the data transfer request is received, so that a data transfer is made in divisions if the requested transfer data length exceeds a length limit determined by the transfer priority;

generating means coupled to said limiting means for generating a first data transfer request in place of each operating system with the transfer data length determined by said limiting means so as to start a first data transfer between the main storage and the external storage; and calculating means coupled to said generating means for calculating a data length of a remaining transfer data which remains to be transferred when the first data transfer is completed and for automatically generating a second data transfer request requesting transfer of the remaining transfer data, said second data transfer request being inserted in the queue of said queuing means so that the remaining transfer data is transferred between the main storage and the external storage in one or a plurality of second data transfers.

2. The data transfer control system as claimed in claim 1, wherein said generating means includes means for selecting a free path out of a plurality of paths between the main storage and the external storage in response to each data transfer request.

3. The data transfer control system as claimed in claim 1, wherein said calculating means includes means for sending completion information to the operating system of the virtual machine when the data transfer of the transfer data length requested by the virtual machine is completed between the main storage and the external storage.

4. The data transfer control system as claimed in claim 1, wherein said completion information is sent to the operating system of the virtual machine by an external interrupt.

5. The data transfer control system as claimed in claim 1, wherein said limiting means accepts a data transfer request in the queue of said queuing means during each of the first and second data transfers.

6. The data transfer control system as claimed in claim 1, wherein said data transfer requests from the operating systems of the virtual machines are asynchronous instructions selected from a group consisting of a first instruction which instructs a data transfer of a specified length from the main storage to the external storage by specifying virtual addresses of the main and external storages, a second instruction which instructs a data transfer of a specified length from the external storage to the main storage by specifying virtual addresses of the external and main storages, a third instruction which instructs a data transfer of a specified length from the main storage to the external storage by specifying real addresses of the main and external storages, and a fourth instruction which instructs a data transfer of a specified length from the external storage to the main storage by specifying real addresses of the external and main storages.

7. A data transfer control system as claimed in claim 6, which further comprises means for generating a fifth instruction which is a synchronous instruction and requests the length of actually transferred data when a data transfer is made responsive to one of said first through fourth instructions, and said calculating means calculates the data length of the remaining transfer data in response to said fifth instruction.

8. The data transfer control system as claimed in claim 1, wherein said queuing means makes the queue of the data transfer requests in the form of a chain of request tables respectively including first information which are required for generating the first data transfer request in said generating means, second information including at least the transfer data length, a transfer source address and a transfer destination address, and third information including at least the data length of the remaining transfer data.

9. The data transfer control system as claimed in claim 8, wherein said first information includes at least identification information for identifying the virtual machine, identification information for identifying the operating system of the virtual machine and identification information for identifying the kind of instruction.

10. A data transfer control system for a virtual machine system which includes a plurality of virtual machines, a main storage and an external storage which is accessible by each of the virtual machines, said data transfer control system comprising:

storage means for storing at least transfer priorities of each of virtual machines;

queuing means for making a queue of data transfer requests which request data transfers between the main storage and the external storage and are received from operating systems which operate on each of the virtual machines;

limiting means coupled to said storage means and said queuing means for limiting a transfer data length of one data transfer which is requested by each data transfer request in the queue of said queuing means depending on the transfer priority of the virtual machine from which the data transfer request is received, so that a data transfer is made in divisions if the requested transfer data length exceeds a length limit determined by the transfer priority;

generating means coupled to said limiting means for generating a first data transfer request in place of each operating system with the transfer data length determined by said limiting means so as to start a data transfer between the main storage and the external storage; and calculating means coupled to said generating means for calculating a data length of a remaining transfer data which remains to be transferred when the data transfer is completed and for notifying the operating system of the data length of the remaining transfer data so that the operating system generates a data transfer request for the remaining transfer data.

11. The data transfer control system as claimed in claim 10, wherein said generating means includes means for selecting a free path out of a plurality of paths between the main storage and the external storage in response to each data transfer request.

12. The data transfer control system as claimed in claim 10, wherein said calculating means includes means for sending completion information to the operating system of the virtual machine when the data transfer of the transfer data length requested by the virtual machine is completed between the main storage and the external storage.

13. The data transfer control system as claimed in claim 10, wherein said completion information is sent to the operating system of the virtual machine by an external interrupt.

14. The data transfer control system as claimed in claim 10, wherein said limiting means accepts a data transfer request in the queue of said queuing means during the data transfer.

15. The data transfer control system as claimed in claim 10, wherein said data transfer requests from the operating systems of the virtual machines are asynchronous instructions selected from a group consisting of a first instruction which instructs a data transfer of a specified length from the main storage to the external storage by specifying virtual addresses of the main and external storages, a second instruction which instructs a data transfer of a specified length from the external storage to the main storage by specifying virtual addresses of the external and main storages, a third instruction which instructs a data transfer of a specified length from the main storage to the external storage by specifying real addresses of the main and external storages, and a fourth instruction which instructs a data transfer of a specified length from the external storage to the main storage by specifying real addresses of the external and main storages.

16. A data transfer control system as claimed in claim 15, wherein the operating system generates a fifth instruction which is a synchronous instruction and requests the length of actually transferred data when a data transfer is made responsive to one of said first through fourth instructions, and said calculating means calculates the data length of the remaining transfer data in response to said fifth instruction.

17. The data transfer control system as claimed in claim 10, wherein said queuing means makes the queue of the data transfer requests in the form of a chain of request tables respectively including first information which are required for generating the data transfer request in said generating means, second information including at least the transfer data length, a transfer source address and a transfer destination address, and third information including at least the data length of the remaining transfer data.

18. The data transfer control system as claimed in claim 17, wherein said first information includes at least identification information for identifying the virtual machine, identification information for identifying the operating system of the virtual machine and identification information for identifying the kind of instruction.

* * * * *